Patented Nov. 24, 1925.

1,562,517

UNITED STATES PATENT OFFICE.

RUDOLF PÖRSCKE, OF HAMBURG, GERMANY.

ELECTROLYTE FOR GALVANIC ELEMENTS.

No Drawing.  Application filed August 29, 1921. Serial No. 496,637.

*To all whom it may concern:*

Be it known that I, RUDOLF PÖRSCKE, a citizen of the German Republic, residing at Hamburg, Germany, have invented certain new and useful Improvements in Electrolytes for Galvanic Elements, of which the following is a specification.

Sal ammoniac has until now been generally used as an exciter-electrolyte in (Leclanché) batteries. Solutions of sal ammoniac in conjunction with suitable other solutions of chlorides, such for instance as chloride of zinc solutions or chloride of calcium solutions, have also been employed, particularly for dry cells. It has now been found that, even in the case of Leclanché cells, a combination occurs in time between the manganese peroxid and the chloride of ammonium solution. When natural pyrolusite is used, however, this action is so weak that it only affects the use of the elements after these have been working for years.

In the case, however, of elements with artificial manganese dioxid, for instance, such as contain fine precipitated $MnO_2$ or $Mn_3O_7$ or $Mn_3O_8$ as depolarizing agent, it has been found that with these fine precipitates of manganese compounds, a combination very soon takes place between the sal ammoniac and the manganese compound, and that in fact the higher the grade of the manganese-oxygen compounds, the quicker will be the action of the sal ammoniac thereupon.

Pocket lamp batteries, for instance, which chiefly contain artificial manganese oxids, become useless in a few weeks time when a solution of chloride of ammonium is used, owing to the effect of the latter on the finely precipitated manganese compound, and an injurious action of the solution of chloride of ammonium is also noticeable in such batteries as are chiefly prepared with natural pyrolusite with an addition of artificial manganese oxids.

It has now been observed that chloride solutions which are free from chloride of ammonium have absolutely no effect on the artificial manganese oxids in the element, and most excellent results have particularly been obtained with a pure solution of chloride of magnesium or a solution of chloride of calcium; these have no effect whatever on the fine artificial manganese oxid precipitate and do not enter into combinations of any kind with this product. Artificial manganese oxid batteries in which chloride of magnesium or chloride of calcium are used remain serviceable for months and can bear storage even better than sal ammoniac batteries made with natural pyrolusite.

The object of the invention is therefore the use as an electrolyte of a solution of either chloride of magnesium or a solution of chloride of calcium, (hereinafter referred to as an alkaline earth metal chlorid) which are free of ammonium salts, for galvanic elements in which artificial manganese oxid is used as depolarizer.

According to the present invention, a pure solution of chloride of magnesium or a solution of chloride of calcium of as high a grade as possible is used without addition of sal ammoniac. To this solution is only added a small percentage of any kind of mercury salt in order to produce an automatic amalgamation of the zinc.

The solutions employed may suitably have a specific gravity of 1.05 to 1.35 corresponding to 10–40° Bé. The internal resistance of the element is somewhat higher with this salt solution than it is when sal ammoniac is used, but on the other hand it remains constant during the whole discharge of the element, whereby a complete utilization of the depolarizer is attained.

Furthermore, a very particular advantage is that the salt never crystallizes out, and that absolutely no crystals are ever formed in the element, even after complete discharge of the element, and after discharges on short circuit. As a result of this characteristic, the power of recovery of elements filled with the electrolytes claimed is considerably greater than when solutions of sal ammoniac are used.

It may be noted that calcium and magnesium are both in the second group, according to the periodic classification, and they have, as atomic weights, 40.1 and 24.4 respectively.

What I claim as my invention and desire to secure by Letters Patent is:—

1. A galvanic cell containing an artificial manganese-oxygen compound as a depolarizer, and containing as an electrolyte, a solution of an alkaline earth metal chloride, such electrolyte being free from ammonium salts, free from dissolved substances of a highly oxidizing character, such electrolyte initially also containing a small quantity of a mercury salt.

2. A galvanic cell containing an artificial oxid of manganese as a depolarizer, and containing as an electrolyte a solution of a chlorid of a metal which is found in the second group of the periodic classification and having an atomic weight between 24.4 and 40.1, such electrolyte being free from ammonium salts but initially containing a small quantity of a mercury salt.

In testimony whereof I have signed my name to this specification.

RUDOLF PÖRSCKE.